United States Patent [19]

Fujita et al.

[11] Patent Number: 4,973,147
[45] Date of Patent: Nov. 27, 1990

[54] HOLDING DEVICE FOR A CONNECTOR ASSOCIATED WITH AN ELECTRICALLY CONTROLLED AUTOMOTIVE MIRROR

[75] Inventors: Masaki Fujita; Noriyasu Shamoto, both of Aichi, Japan

[73] Assignee: Kabushiki Kaisha Tokai Rika Denki Seisakusho, Aichi, Japan

[21] Appl. No.: 497,704

[22] Filed: Mar. 23, 1990

[30] Foreign Application Priority Data

Mar. 23, 1989 [JP] Japan .................. 1-33980[U]

[51] Int. Cl.$^5$ .............................................. G02B 7/18
[52] U.S. Cl. ...................................... 350/637; 439/34
[58] Field of Search .................. 350/637; 307/10.1; 439/34

[56] References Cited

U.S. PATENT DOCUMENTS

| 4,693,571 | 9/1987 | Kimura et al. | 350/637 |
| 4,815,837 | 3/1989 | Kikuchi et al. | 350/634 |
| 4,862,011 | 8/1989 | Wright | 439/34 |
| 4,930,370 | 6/1990 | Yoshida | 350/633 |

Primary Examiner—Bruce Y. Arnold
Assistant Examiner—J. P. Ryan
Attorney, Agent, or Firm—Finnegan, Henderson, Farabow, Garrett, and Dunner

[57] ABSTRACT

A holding device for a connector associated with an electrically controlled automotive mirror is provided such that the connector becomes fixed to a mirror unit. With the connector being fixed to the mirror unit, connections between the connector and mated connectors provided in automotive vehicle bodies may be made in a much easier fashion.

4 Claims, 2 Drawing Sheets

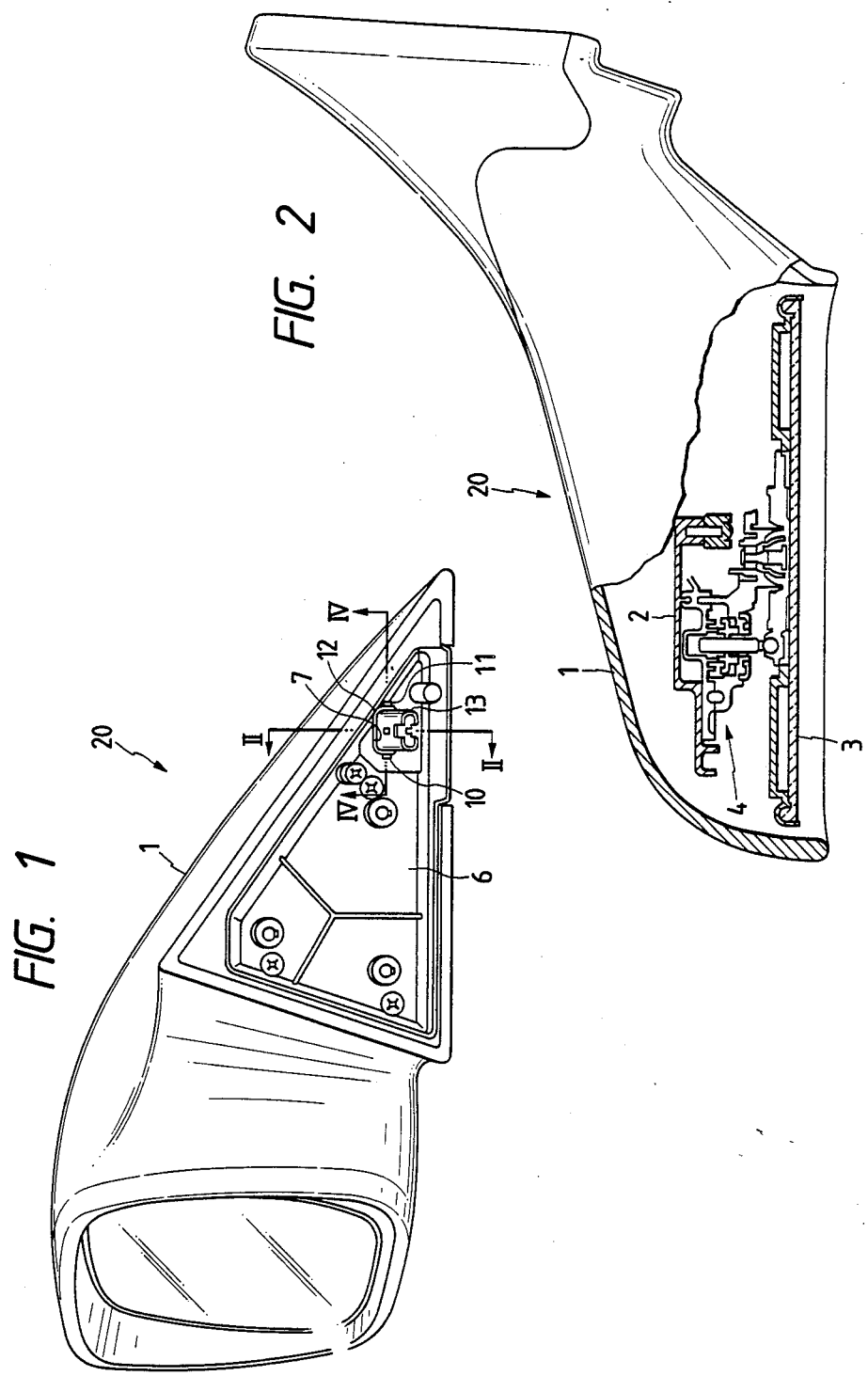

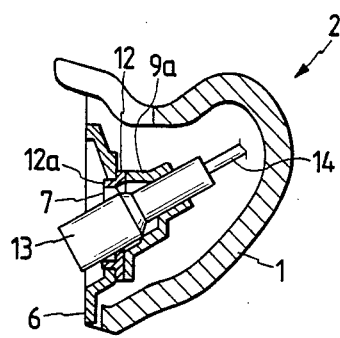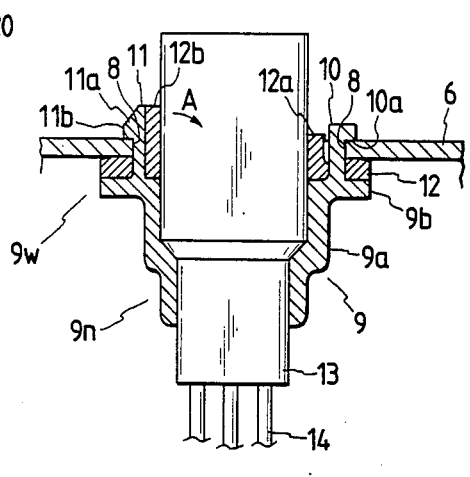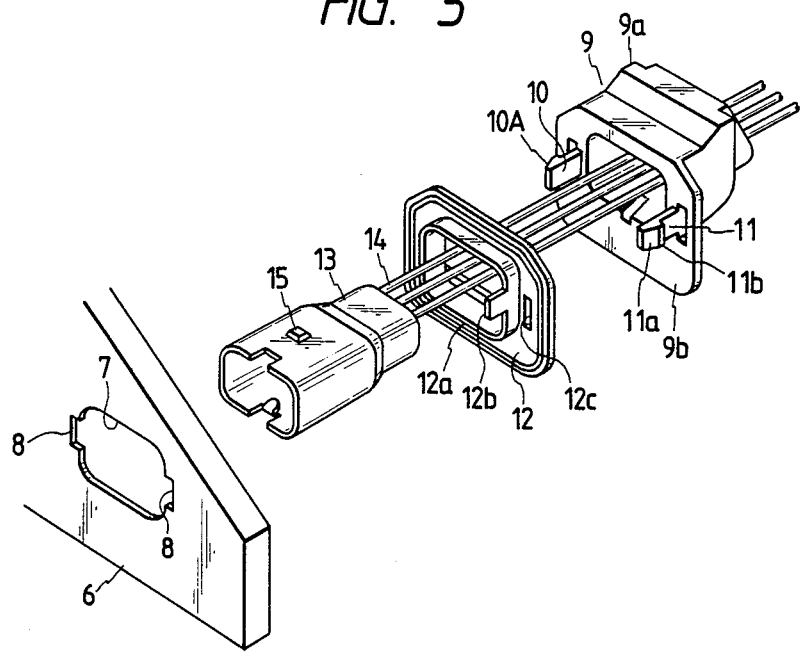

HOLDING DEVICE FOR A CONNECTOR ASSOCIATED WITH AN ELECTRICALLY CONTROLLED AUTOMOTIVE MIRROR

BACKGROUND OF THE INVENTION

1. Field of the Invention

This invention relates to a holding device for a connector associated with an electrically controlled automotive mirror, and more particularly, to a device for fixing a connector to a portion of a mirror unit, wherein the connector is provided at an end of the wiring extending from an electrical driving device for controlling the automotive mirror.

2. Description of the Related Art

An electrically controlled automotive mirror is generally provided with a connector at one end of the wiring extending from an electrical driving device used to position the automotive mirror. The connector is designed to be connected with another, mated connector provided on a main harness provided in the body of an automotive vehicle.

If the mirror is to be mounted on the body, it is necessary to connect the connectors with each other in advance. Typically, a worker must use both hands for connecting the connectors together, holding the mirror unit under his arm. This method tends to decrease working efficiency.

OBJECT OF THE INVENTION

It is, therefore, an object of the present invention to provide a holding device for a connector associated with an electrically controlled automotive mirror, in which the connector can be connected to another, mated connector with the use of only one hand, thereby improving working efficiency.

SUMMARY OF THE INVENTION

In order to attain the above-noted and other objects, a holding device for a connector associated with an electrically controlled automotive mirror is provided. The connector is adapted for connection to a mated connector provided in an automotive vehicle body. The holding device comprises a mirror unit, adapted for connection to an automotive vehicle body, including a mirror, an electrical driving device for driving the mirror, and a housing for housing the mirror and the electrical driving device. A bracket is provided and adapted to be fixed to a side of the housing adapted for connection to the automotive vehicle body. A through hole is provided in the bracket, the through hole including two engaging portions at opposing sides of the through hole. A hollow cylindrical member is provided, including a non-elastic claw and an elastic claw. The nonelastic claw is adapted to engage with one of the engaging portions, and the elastic claw is adapted to engage with another one of the engaging portions. A connector is provided at an end of a wiring extending from the electrical driving device, and the connector is adapted for insertion into and to be held by an inner surface of the hollow cylindrical member.

The holding device preferably further includes a sealing member adapted to be disposed between the bracket and the hollow cylindrical member. The sealing member preferably includes a projection adapted to be interposed between the connector and the elastic claw. The projection preferably prevents the elastic claw from disengaging with the another one of the engaging portions.

A method is provided for securing a connector associated with an electrically controlled automotive mirror. The connector is adapted for connection to a mated connector provided in an automotive vehicle body. The method comprises the step of providing a mirror unit, adapted for connection to an automotive vehicle body, including a mirror, an electrical driving device for driving the mirror, and a housing for housing the mirror and the electrical driving device. The method further includes the step of providing a bracket to be fixed to a side of the housing adapted for connection to the automotive body. The method further includes the step of providing a through hole in the bracket, the through hole including two engaging portions at opposing sides of the through hole. Further, the method includes the step of providing a hollow cylindrical member including a wide end, a narrow end, a non-elastic claw, and an elastic claw. Further provided are the steps of providing a wiring from the electrical driving device, and disposing the hollow cylindrical member within the mirror unit, such that the wide end is closer to the bracket than the narrow end. In addition, the method includes the steps of passing the wiring through the hollow cylindrical member, and providing a connector at an end of the wiring extending from the electrical driving device, wherein the connector is adapted to be inserted into the wide end of the hollow cylindrical member. Further, the method includes the steps of engaging the non-elastic claw and the elastic claw with the engaging portions of the through hole, and securing the connector through the through hole and into the interior of the hollow cylindrical surface.

BRIEF DESCRIPTION OF THE DRAWINGS

The accompanying drawings, which are incorporated in and constitute a part of the specification, illustrate the presently preferred embodiments and methods of the invention and, together with the general description given above and the detail description of the preferred embodiments and method given below, serve to explain the principles of the invention.

FIG. 1 depicts a side view of a preferred embodiment of the invention;

FIG. 2 is a partially sectional top view of FIG. 1;

FIG. 3 is a cross sectional view along the III—III line in FIG. 1;

FIG. 4 is a cross-sectional view along the IV—IV line in FIG. 1; and

FIG. 5 is an exploded perspective view showing the preferred embodiment of FIG. 1.

DETAILED DESCRIPTION OF THE PREFERRED EMBODIMENTS

A preferred embodiment of the present invention is hereinafter described in detail with reference to the accompanying drawings.

In accordance with the invention, a holding device for a connector associated with an electrically controlled automotive mirror is provided. The connector is adapted for connection to a mated connector provided in an automotive vehicle body. The device comprises a mirror unit, adapted for connection to an automotive vehicle body, including a mirror, an electrical driving device for driving the mirror, and a housing for housing the mirror and the electrical driving device.

FIG. 1 and FIG. 2 depict a preferred embodiment wherein a mirror unit 20 includes a mirror housing 1, preferably made of plastic, and a support frame 2, fixed to an interior of the mirror housing 1. The support frame 2 is provided with an electrical driving device 4 for driving a mirror 3 up and down and right and left.

In accordance with the invention, a bracket is provided that is adapted to be fixed to a side of the housing adapted for connection to the automotive vehicle body.

FIG. 1 depicts a preferred embodiment wherein a bracket 6 is provided on a side of the housing 1, where the housing 1 is to be mounted onto an automotive vehicle body. In a preferred embodiment, the bracket 6 is fixed to the housing 1. The bracket 6 may preferably be made by a zinc die casting.

In accordance with the invention, a through hole is provided in the bracket, the through hole including two engaging portions at opposing sides of the through hole.

FIG. 5 depicts the embodiment of FIG. 1 wherein bracket 6 is provided with an essentially rectangular through hole 7 having round corners. Through hole 7 is formed with engage portions 8 at its right and left sides.

In accordance with the invention, a hollow cylindrical member is provided including a non-elastic claw and an elastic claw. The non-elastic claw is adapted to engage with one of the engaging portions, and the elastic claw is adapted to engage with another one of the engaging portions.

As shown in FIG. 4 and FIG. 5, a hollow cylindrical member 9 is provided with a cylindrical portion 9a and a flange 9b. A non-elastic claw 10 and an elastic claw 11 are projected from right and left portions of the flange 9b, respectively. The non-elastic claw 10 is relatively thick and is formed with an engaging step portion 10a at a distal end. The elastic claw 11 is thin, relative to the non-elastic claw 10, and is formed with an engaging claw portion 11b, having a guiding surface 11a, at a distal end.

In accordance with the invention, the device preferably includes a sealing member adapted to be disposed between the bracket and the hollow cylindrical member. The sealing member preferably includes a projection adapted to be interposed between the connector and the elastic claw. The projection preferably prevents the elastic claw from disengaging with the another one of the engaging portions.

FIG. 4 and FIG. 5 depict a sealing member 12 that is kept in contact with a periphery of the flange 9b and is formed with a ring portion 12a along an inner circumferential portion so as to adjoin the cylindrical portion 9a. Sealing member 12 includes two spaces 12c disposed in opposing sides of the sealing member 12. Non-elastic claw 10 passes through a corresponding space 12c, while elastic claw 11 passes through another space 12c so that sealing member 12 may contact with the periphery of the flange 9b.

The hollow cylindrical member 9 is disposed onto the through hole 7 through the sealing member 12 from a backside of the bracket 6 so as to engage the non-elastic claw 10 with one of the engaging portions 8 and to engage the elastic claw 11 with the another one of the engaging portions 8. The flange 9b is kept in close contact with the back side of bracket 6 through the sealing member 12. The ring portion 12a of the sealing member 12 is kept in contact with an inner circumferential surface of the through hole 7, and the projection 12b is kept in contact with the elastic claw 11, thus preventing the elastic claw 11 from disengaging with the another one of the engaging portions 8 when connector 13 is in place.

In accordance with the invention, a connector is provided at an end of a wiring extending from the electrical driving device. The connector is adapted for insertion into and to be held by an inner surface of the hollow cylindrical member.

FIG. 5 depicts the connector 13 being provided at an end of wiring 14 extending from electrical driving device 4. The connector 13 is inserted into and is held by an inner cylindrical portion of the hollow cylindrical member 9, such that the connector 13 is partially projecting from the bracket 6. The ring portion 12a of the sealing member 12 is kept in close contact with an outer circumferential portion of the connector 13 to preferably attain a water proof property.

The projection 12b of the sealing member 12 is interposed between the connector 13 and the elastic claw 11 to prevent the elastic claw 11 from disengaging with the another one of the engaging portions 8. The projection 12b prevents the elastic claw 11 from moving in the direction indicated by an arrow A in FIG. 4.

The connector 13 is held in position through the through hole 7 and within the interior of the hollow cylindrical member 9 through friction and preferably through the use of a securing projection 15. Securing projection 15 is obstructed by the bracket 6 and prevents the connector 13 from passing further the through hole 7 in a direction away from the hollow cylindrical member 9. The connector 13 may preferably be constructed with flexible materials, such that by pushing down on the area near the securing projection 15, the securing projection 15 may be positioned such that it would fit through the through hole 7 and allow for additional movement of the connector 13 through the through hole 7. In this manner, the connector may be inserted through the through hole 7 and into and held in the hollow cylindrical member 9 from a front side of the bracket 6. Once secured, the connector may be removed by pushing down on the area near the projection 15.

By way of illustration, the method of the present invention will be described with reference to the preferred embodiments previously described.

In accordance with the invention, a method is provided for securing a connector associated with an electrically controlled automotive mirror. The connector is adapted for connection to a mated connector provided in an automotive vehicle body. The method includes the step of providing a mirror unit, adapted for connection to an automotive vehicle body, including a mirror, an electrical driving device for driving the mirror, and a housing for housing the mirror and the electrical driving device.

FIG. 1 and FIG. 2 depict a preferred embodiment wherein mirror unit 20 includes the housing 1 and the support frame 2. The support frame 2 is provided with the electrical driving device 4 for driving the mirror 3 up and down and right and left.

In accordance with the invention, the method further includes the steps of providing a bracket to be fixed to a side of the housing adapted for connection to the automotive body, and providing a through hole in the bracket, the through hole including two engaging portions at opposing sides of the through hole.

FIG. 1 and FIG. 5 depict the bracket 6 being fixed to the side of housing 1. The bracket 6 includes through hole 7, with through hole 7 including two engaging portions 8 at opposing sides of the through hole 7.

In accordance with the invention, the method further includes the step of providing a hollow cylindrical member including a wide end, a narrow end, a non-elastic claw, and an elastic claw.

FIG. 4 and FIG. 5 depict the hollow cylindrical member 9 including a wide end 9w, a narrow end 9n, the non-elastic claw 10, and the elastic claw 11.

In accordance with the invention, the method further includes the steps of providing a wiring from the electrical driving device, and disposing the hollow cylindrical member within the mirror unit such that the wide end is closer to the bracket than the narrow end.

FIG. 3, FIG. 4 and FIG. 5 depict wiring 14 being provided from the electrical driving device 4. The hollow cylindrical member 9 is disposed within the mirror unit 20, such that the wide end 9w is closer to the bracket 6 than the narrow end 9n.

In accordance with the invention, the method further includes the steps of passing the wiring through the hollow cylindrical member, and providing a connector at an end of wiring extending from the electrical driving device, wherein the connector is adapted to be inserted into the wide end of the hollow cylindrical member.

FIG. 3, FIG. 4 and FIG. 5 depict wiring 14 being passed through the hollow cylindrical member and provided with the connector 13 at one end. Wiring 14 extends from the electrical driving device 4. The connector 13 is adapted to be inserted into the wide end 9w of the hollow cylindrical member 9.

In accordance with the invention, the method further includes the steps of engaging the non-elastic claw and the elastic claw with the engaging portions of the through hole, and securing the connector through the through hole and into the interior of the hollow cylindrical surface.

FIG. 3, FIG. 4 and FIG. 5 depict the non-elastic claw 11 and the elastic claw 10 being positioned to engage the engaging portions 8 of the through hole 7. The method preferably includes the use of the sealing member 12, disposed between the hollow cylindrical member 9 and the bracket 6 to achieve a water proof property.

The connector 13 is secured through the through hole 7 and within the interior of the hollow cylindrical member 9 through friction and preferably through the use of a securing projection 15. Securing projection 15 is obstructed by the bracket 6 and prevents the connector 13 from passing further through the through hole 7 in a direction away from the hollow cylindrical member 9. The connector 13 may preferably be constructed with flexible materials, such that by pushing down on the area near the securing projection 15, the, securing projection 15 may be positioned such that it would fit through the through hole 7 and allow for additional movement of the connector 13 through the through hole 7. In this manner, the connector may be inserted through the through hole 7 and into and secured in the hollow cylindrical member 9 from a front side of the bracket 6. Once secured, the connector may be removed by pushing down on the area near the projection 15.

With the connector 13 secured within the hollow cylindrical member 9, a worker is able to grasp the mirror unit 20 with one hand and a mated connector (not shown) provided in an automotive vehicle body with the other hand, and directly connect the two connectors together This method of connecting connectors together is far superior and far more efficient than prior methods, in which a worker needed both hands to connect the connectors and had to use some other means to support the mirror unit.

Additional advantages and modification will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

WHAT IS CLAIMED IS:

1. A holding device for a connector associated with an electrically controlled automotive mirror, the connector being adapted for connection to a mated connector provided in an automotive vehicle body, the device comprising:

a mirror unit, adapted for connection to an automotive vehicle body, including a mirror, an electrical driving device for driving the mirror, and a housing for housing the mirror and the electrical driving device;

a bracket adapted to be fixed to a side of the housing adapted for connection to the automotive vehicle body;

a through hole provided in the bracket, the through hole including two engaging portions at opposing sides of the through hole;

a hollow cylindrical member including a non-elastic claw and an elastic claw, the non-elastic claw being adapted to engage with one of the engaging portions, the elastic claw being adapted to engage with another one of the engaging portions; and a connector provided at an end of a wiring extending from the electrical driving device, the connector being adapted for insertion into and to be held by an inner surface of the hollow cylindrical member.

2. The device according to claim 1, further comprising:

a sealing member adapted to be disposed between the bracket and the hollow cylindrical member.

3. The device according to claim 2, wherein:

the sealing member includes a projection adapted to be interposed between the connector and the elastic claw; and wherein the projection prevents the elastic claw from disengaging with the another one of the engaging portions.

4. A method for securing a connector associated with an electrically controlled automotive mirror, the connector being adapted for connection to a mated connector provided in an automotive vehicle body, the method comprising the steps of:

providing a mirror unit, adapted for connection to an automotive vehicle body, including a mirror, an electrical driving device for driving the mirror, and a housing for housing the mirror and the electrical driving device;

providing a bracket to be fixed to a side of the housing adapted for connection to the automotive body;

providing a through hole in the bracket, the through hole including two engaging portions at opposing sides of the through hole;

providing a hollow cylindrical member including a wide end, a narrow end, a non-elastic claw, and an elastic claw;

providing a wiring from the electrical driving device;
disposing the hollow cylindrical member within the mirror unit, such that the wide end is closer to the bracket than the narrow end;
passing the wiring through the hollow cylindrical member;
providing a connector at an end of the wiring extending from the electrical driving device, wherein the connector is adapted to be inserted into the wide end of the hollow cylindrical member;
engaging the non-elastic claw and the elastic claw with the engaging portions of the through hole; and
securing the connector through the through hole and into the interior of the hollow cylindrical member.

* * * * *